(12) United States Patent
Sensui

(10) Patent No.: US 11,693,528 B2
(45) Date of Patent: Jul. 4, 2023

(54) INFORMATION PROCESSING SYSTEM, INFORMATION PROCESSING METHOD, INFORMATION PROCESSING DEVICE, AND NON-TRANSITORY COMPUTER-READABLE MEDIUM

(71) Applicant: NINTENDO CO., LTD., Kyoto (JP)

(72) Inventor: Kazuyoshi Sensui, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/698,442

(22) Filed: Mar. 18, 2022

(65) Prior Publication Data
US 2022/0308708 A1 Sep. 29, 2022

(30) Foreign Application Priority Data
Mar. 24, 2021 (JP) ................... 2021-050870

(51) Int. Cl.
*G06F 3/0481* (2022.01)
*G06T 11/00* (2006.01)

(52) U.S. Cl.
CPC ............ *G06F 3/0481* (2013.01); *G06T 11/00* (2013.01); *G06T 2200/24* (2013.01)

(58) Field of Classification Search
CPC .................................................... G05F 3/0481
USPC ........................................................ 715/808
See application file for complete search history.

(56) References Cited

U.S. PATENT DOCUMENTS

| | | | | |
|---|---|---|---|---|
| 2003/0088872 A1* | 5/2003 | Maissel | ................ | G11B 27/329 348/E7.071 |
| 2006/0036488 A1* | 2/2006 | Golan | .................... | G06Q 30/02 705/14.67 |
| 2007/0067800 A1* | 3/2007 | Wachtfogel | ........ | H04N 21/4331 386/E5.07 |
| 2008/0097915 A1* | 4/2008 | Golan | .................... | G06Q 30/02 705/14.69 |
| 2008/0120240 A1* | 5/2008 | Ginter | .................. | G06Q 20/085 705/51 |
| 2008/0301264 A1* | 12/2008 | Mathai | ............... | G06Q 30/0277 709/219 |
| 2009/0006188 A1* | 1/2009 | Guo | ....................... | G06Q 30/02 705/14.27 |
| 2009/0119165 A1* | 5/2009 | Cotgreave | .............. | G06Q 30/02 705/14.56 |

(Continued)

FOREIGN PATENT DOCUMENTS

JP 2016181155 A 10/2016

*Primary Examiner* — Reza Nabi
(74) *Attorney, Agent, or Firm* — Scully, Scott, Murphy & Presser, P.C.

(57) ABSTRACT

An information processing system 1000 comprises an image output unit 64 configured to output a displayed image 641 to a display device 70 during the execution of a predetermined application; a UI object placement unit 65 configured to place a guide UI object 642 so that the UI object 642 is included in the displayed image 641; a detailed information output unit 64 configured to output to the display device 70 the detailed information associated with the guide UI object 642 when a user indicates the guide UI object 642 included in the displayed image 641; and a UI object removal unit 67 configured to, when a predetermined time has elapsed since the detailed information has been viewed, remove the guide UI object 642 from the displayed image 641 so that it is not included in the displayed image 641.

17 Claims, 13 Drawing Sheets

(56) References Cited

U.S. PATENT DOCUMENTS

| | | | |
|---|---|---|---|
| 2011/0184805 A1* | 7/2011 | Margalit | G06Q 30/0251 705/14.49 |
| 2014/0149213 A1* | 5/2014 | Fallatah | G06Q 30/0255 705/14.53 |
| 2014/0188615 A1* | 7/2014 | Badenhop | G06Q 30/0267 705/14.58 |
| 2015/0332317 A1* | 11/2015 | Cui | G06Q 50/01 705/14.46 |
| 2016/0117740 A1* | 4/2016 | Linden | G06Q 50/01 705/14.66 |
| 2016/0125455 A1* | 5/2016 | Tong | G06Q 30/0274 705/14.49 |
| 2016/0148264 A1* | 5/2016 | Winstanley | G06F 16/9535 705/14.55 |
| 2016/0162938 A1* | 6/2016 | LeBeau | G06Q 30/0255 705/14.53 |
| 2016/0164982 A1* | 6/2016 | LeBeau | G06Q 50/01 709/204 |
| 2016/0165002 A1* | 6/2016 | LeBeau | H04L 67/141 709/204 |
| 2016/0283056 A1* | 9/2016 | Kaminosono | H04W 4/029 |
| 2017/0061483 A1* | 3/2017 | Cheng | G06Q 30/0207 |
| 2017/0061486 A1* | 3/2017 | Cheng | G06Q 30/0275 |
| 2017/0188115 A1* | 6/2017 | Bafekr | H04N 21/812 |
| 2017/0270551 A1* | 9/2017 | Chen | G06Q 50/01 |
| 2022/0308708 A1* | 9/2022 | Sensui | G06F 3/0481 |

* cited by examiner

INFORMATION PROCESSING SYSTEM, INFORMATION PROCESSING METHOD, INFORMATION PROCESSING DEVICE, AND NON-TRANSITORY COMPUTER-READABLE MEDIUM

CROSS-REFERENCE TO RELATED APPLICATIONS

This application claims the benefit of Patent Application No. 2021-050870 filed in Japan on Mar. 24, 2021, the contents of which application are hereby incorporated by reference.

BACKGROUND

The present disclosure relates to an information processing system, an information processing method, an information processing device, and a non-transitory computer-readable medium, which displays detailed information in response to indication operations on UI objects.

It is known that an information processing system, such as a game system, that displays a UI object such as an icon in a displayed image of a predetermined application such as a game application, and displays detailed information associated with the UI object in response to a user's indication operation to the UI object. For example, in JPA2016-181155, it is disclosed that, in a menu screen, an image 53 of a speech balloon including words related to an advertising video 38 as detailed information is arranged. In other words, a UI object such as a balloon image 53 is displayed for the purpose of having a user view detailed information such as an advertisement video 38.

Such detailed information is basically valid for a certain period of time, and after a certain period of time, a new UI object is displayed to provide another detailed information.

SUMMARY

It is desired to improve on the time to present detailed information by placing a UI object to present detailed information.

An information processing system in one aspect comprises a processor, wherein the processor is configured to: output a displayed image to a display device during execution of a predetermined application; place a UI object so that the UI object is included in the displayed image; output to the display device the detailed information associated with the UI object when a user indicates the UI object included in the displayed image; and when a predetermined time has elapsed since the detailed information has been viewed, remove the UI object from the displayed image so that it is not included in the displayed image.

With this configuration, the time period for placing the UI object to display detailed information is set to a predetermined time after the detailed information has been viewed so that the detailed information can be presented to each user in an appropriate period.

The information processing system described above, the processor may be configured to, in the removal of the UI object, determine that the detailed information has been viewed either: when a first indication operation among indication operations on the UI object is performed; when the detailed information is output to the display device for the first time; when all of the detailed information is displayed on the display device for the first time; or when a display of the detailed information for the first time has been completed.

In the information processing system described above, the displayed image may be a virtual space image obtained by capturing a virtual space with a virtual camera, and the processor may be configured to, when placing the UI object, superimpose the UI object on the virtual space image.

In the information processing system described above, the displayed image may be a virtual space image obtained by capturing a virtual space with a virtual camera, and the processor may be configured to, when placing the UI object, place the UI object in the virtual space.

In the information processing system described above, the processor may be further configured to, in the predetermined application, from the UI object has been viewed until the predetermined time passes, generate a first event in which the user is included as a target.

This configuration allows the event to start and continue for a predetermined period of time in response to the user's indication operation so that any user can be fairly given a period of time in which to participate in the first event.

In the information processing system described above, the first event may be an event in which a price of an item available for purchase by the user in the application is lower than when the first event has not occurred, and the processor may be configured to, when outputting the detailed information, output a second detailed information for the purchase of an item to the display device in response to a user's indication operation on the detailed information.

This configuration makes it easy for users to participate in the event of a discounted item sale campaign.

In the information processing system described above, the processor may be further configured to generate a second event to be implemented within the application until a predetermined endpoint, and the processer may configured to, when removing the UI object, if the predetermined endpoint arrives before the predetermined time has elapsed since the detailed information about the second event has been viewed, remove the UI object from the displayed image without waiting for the elapse of the predetermined time.

This configuration avoids the situation where detailed information about an event is continued to be provided until after the event is over.

In the information processing system described above, the processor may be further configured to, when removing the UI object, remove the UI object from the displayed image when the user performs a predetermined action in the first event or the second event.

This configuration allows the user to perform a predetermined action in an event to achieve the purpose of providing detailed information and cancel the placement of the UI object in response to the fact that further provision of detailed information is no longer necessary.

In the information processing system described above, the processor may be configured to, when placing the UI object, in response that unviewed detailed information has been viewed, about display form of the UI object corresponding to the detailed information included in the displayed image, place the UI object in a second display format including notification about the predetermined time instead of the UI object in a first format not including the notification.

With this configuration, the user can recognize the passage of time (typically, the remaining time until the passage of the predetermined time) by the UI object in the second display format included in the display image.

In the information processing system described above, the processor may be configured to, when placing the UI object, select and place at least one of the UI objects from a plurality of candidates.

With this configuration, when there are multiple UI objects to be placed, instead of placing all of them, it is possible to narrow down the UI objects to be placed.

In the information processing system described above, the processor may be configured to, when placing the UI object, select the UI object to be placed from the plurality of candidates based on a history of past user behavior in the predetermined application.

This configuration allows to select and place the appropriate UI object for each user when there are multiple UI objects to be placed.

In the information processing system described above, each of the plurality of candidates may be configured to have a priority level, and the processor may be configured to, when placing the UI object, select the UI object to be placed according to the priority level.

This configuration allows UI objects to be selected and placed according to their priority when there are multiple UI objects to be placed.

In the information processing system described above, the processor may be configured to, when placing the UI object, periodically select the UI object to be placed.

With this configuration, after the placement of a UI object is canceled, a new UI object is not immediately placed in its place, but a new UI object is placed after waiting for the following update timing.

In the information processing system described above, the processor may be configured to, when selecting the UI object to be placed, select the UI object for which the predetermined time has not elapsed since the detailed information has been viewed giving priority to other UI objects.

This configuration avoids that UI objects for which time counting has started will not be placed before the predetermined time has elapsed.

In the information processing system described above, the processor may be configured to, when removing the UI object, remove the UI object from the displayed image when a scene transition is performed in the predetermined application after the predetermined time lapsed.

This configuration eliminates the need to update the displayed image just to cancel the placement of the UI object immediately.

In the information processing system described above, the processor may be configured to, when outputting the detailed information, output the detailed information whenever the user indicates the UI object included in the displayed image, even after the detailed information has been viewed.

This configuration allows the user to display detailed information repeatedly by performing indication operating.

An information processing system in one aspect comprises: an image output unit configured to output a displayed image to a display device during execution of a predetermined application; and a processor, wherein the processor is configured to: output a displayed image to a display device during execution of a predetermined application; place a UI object so that the UI object is included in the displayed image; output to the display device the detailed information associated with the UI object when a user indicates the UI object included in the displayed image; and when a predetermined time has elapsed since the detailed information has been viewed, remove the UI object from the displayed image so that it is not included in the displayed image.

With this configuration also, the time period for placing the UI object to display detailed information is set to a predetermined time after the detailed information has been viewed so that the detailed information can be presented to each user in an appropriate period.

An information processing method in one aspect comprises: outputting a displayed image to a display device during execution of a predetermined application; placing a UI object so that the UI object is included in the displayed image; outputting to the display device the detailed information associated with the UI object when a user indicates the UI object included in the displayed image; and when a predetermined time has elapsed since the detailed information has been viewed, removing the UI object from the displayed image so that it is not included in the displayed image.

With this configuration also, the time period for placing the UI object to display detailed information is set to a predetermined time after the detailed information has been viewed, so that the detailed information can be presented to each user in an appropriate period.

A non-transitory computer-readable medium in one aspect stores an information processing program, wherein the information processing program causes a computer of an information processing apparatus to: output a displayed image to a display device during execution of a predetermined application; place a UI object so that the UI object is included in the displayed image; output to the display device the detailed information associated with the UI object when a user indicates the UI object included in the displayed image; and when a predetermined time has elapsed since the detailed information has been viewed, remove the UI object from the displayed image so that it is not included in the displayed image.

With this configuration also, the time period for placing the UI object to display detailed information is set to a predetermined time after the detailed information has been viewed so that the detailed information can be presented to each user in an appropriate period.

DESCRIPTION OF THE EMBODIMENTS

The game system in embodiments of the present disclosure will be described below with reference to the drawings. The embodiment of implementation described below shows an example of implementing the present disclosure, and does not limit the present disclosure to the specific configuration described below. In the implementation of the present disclosure, the specific configuration according to the embodiments may be adopted as appropriate.

(Overall Configuration of the System)

Figure 1:
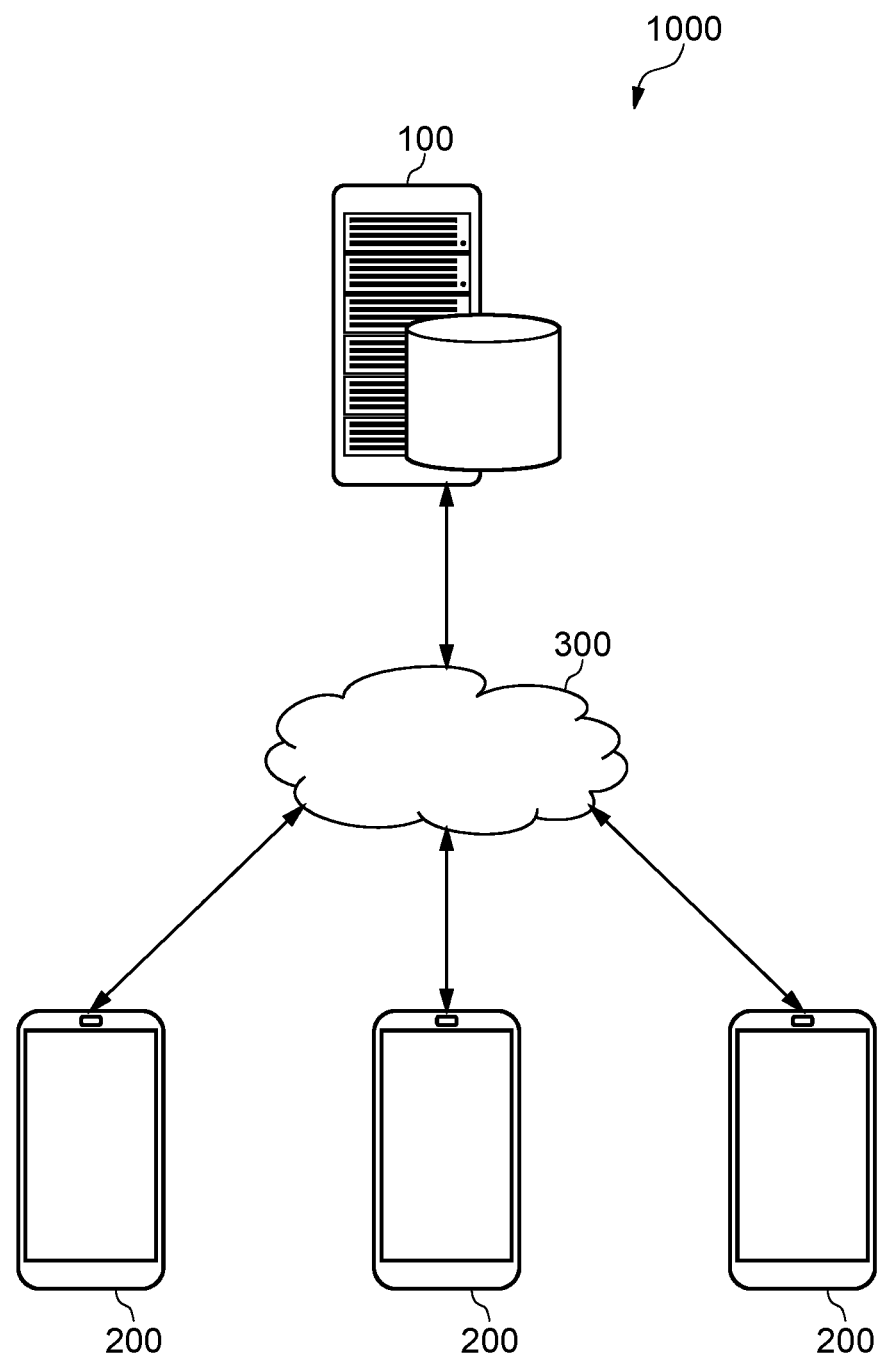
FIG. 1 shows a configuration of the information processing system in an embodiment of the present disclosure.

FIG. 1 shows a configuration of the information processing system in an embodiment of the present disclosure. The information processing system 1000 is equipped with a server device 100 and a plurality of game devices 200 as information processing devices. The server device 100 and each of the plurality of game devices 200 can communicate with each other via a communication network 300. In this embodiment, the game device 200 comprises a smartphone, which is a multi-functional information processing device. The game device 200 is configured by installing an information processing program provided by the smartphone as an application program. The information processing program is stored in a storage medium in a non-transitory and computer-readable manner and is provided to the game device 200 as an information processing device via the storage medium.

The game device 200 may be a dedicated game machine. In this case, the game device 200 can also execute the functions described below by running an information processing program of this embodiment, which is provided as game software. The game software may be provided to the dedicated game machine via a download via a communication network or a cartridge to be installed in the dedicated game machine. In this case, the storage device in the server that provides the game software via the communication network corresponds to the above non-transitory computer-readable medium, and the cartridge also corresponds to the above non-transitory computer-readable medium.

(Overview of the Displayed Image)

Figure 2:
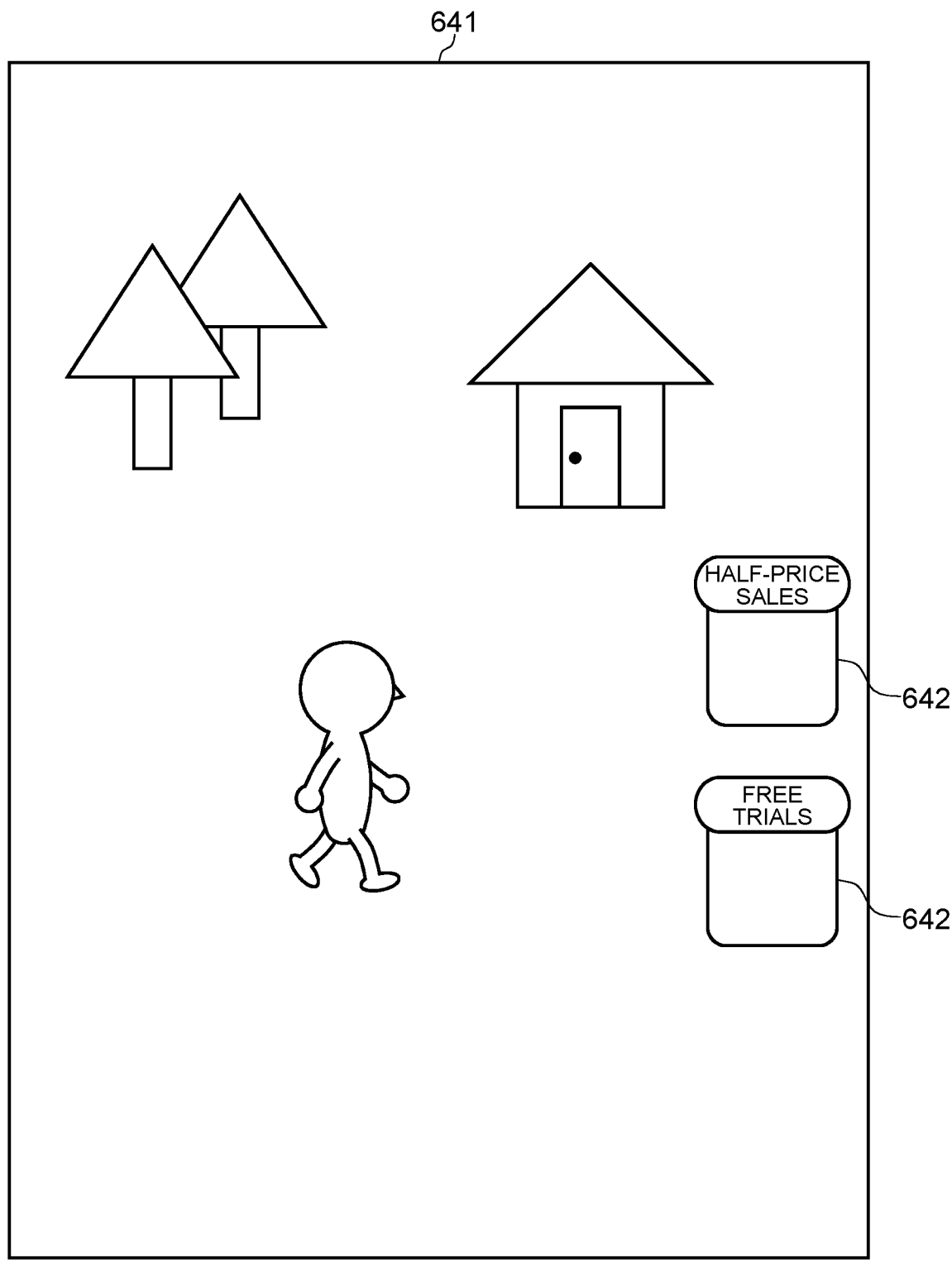
FIG. 2 shows an example of a displayed image in a game in an embodiment of the present disclosure.

FIG. 2 shows an example of a displayed image in a game in an embodiment of the present disclosure. First, referring to FIG. 2, an overview of the displayed image of the present form will be described. In the game in this embodiment, a player character is controlled to progress in a virtual space. The player character moves around in the virtual space and performs various actions in response to the user's operations. The game image 641 is composed of a game image taken by a virtual camera in the virtual space and UI objects such as icons, buttons, etc. superimposed on the game image, wherein the game image includes a player character, non-player characters, and various objects (cars, trees, terrain, etc.) existing in the virtual space therein.

The UI objects are mainly displayed at the edges of the displayed image. In this embodiment, in particular, the displayed image 641 includes a guide UI object 642 for presenting predetermined guide information to the user. By directing the guide UI object 642, the user can view detailed information of the guide.

When there is multiple guide information to be presented to the user, if the guide UI objects 642 of all the guide information are placed in the displayed image 641, there will not be enough space, and the visibility of the virtual space will be reduced. Therefore, in this embodiment, the number of guide UI objects to be included in the displayed image 641 is limited to two. In this embodiment, a limit is also set on the time for placing guide UI objects in the displayed image.

(Overview of the System)

Figure 3:
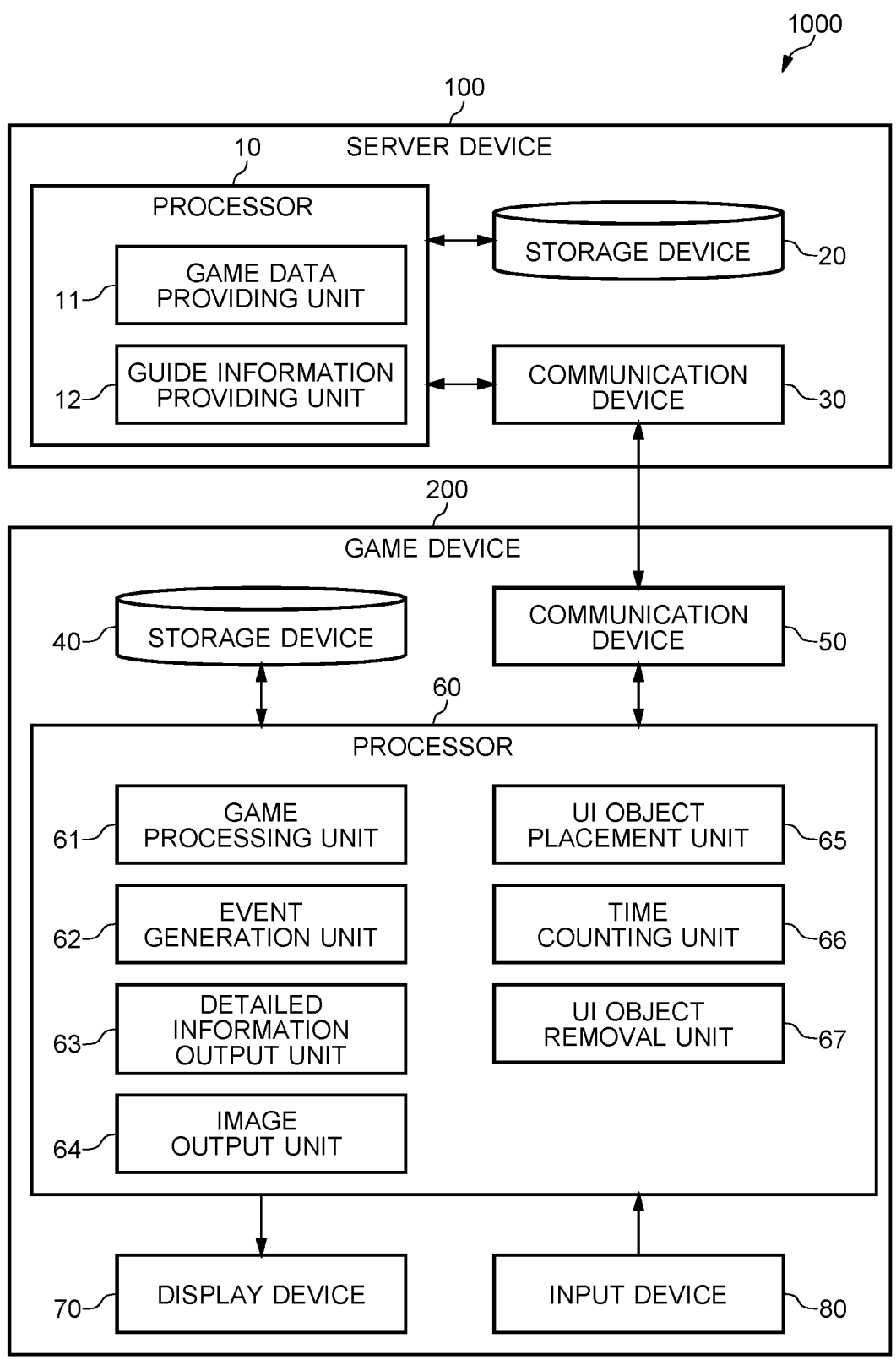
FIG. 3 shows a block diagram of an information processing system in an embodiment of the present disclosure.

FIG. 3 shows a block diagram of an information processing system in an embodiment of the present disclosure. The server device 100 includes a processor 10 that performs information processing as a server device, a storage device 20 that stores various data, a communication device 30 that communicates with a game device 200, and other devices via a communication network 300. The processor 10 has a game data providing unit 11 that provides game data to the game device 200 in response to requests from the game device 200 and guide information providing unit 12 that provides guide information to the game device 200.

The game device 200 has a storage device 40 that stores various data, a communication device 50 that communicates with the server device 100 and other devices via a communication network 300, a processor 60 that performs information processing as a game device, a display device 70 that displays images based on the information processing of the processor 60, and an input device 80 that receives operations by the user and outputs input signals to the processor 60.

The communication device 50 is wirelessly connected to a router and communicates with the server device 100 and other devices via the communication network 300. The display device 70 and the input device 80 are integrally configured as a touch panel in this embodiment. Therefore, the user can perform touch operations such as tapping and dragging directly on the objects displayed on the display device 70. The display device 70 and the input device 80 may be configured as separate units. In this case, the cursor may be displayed on the display device 70 and the input device 80, which is a controller, may be operated to perform various operations while moving the cursor in the image displayed on the display device 70.

The processor 60 is configured by executing an information processing program of an embodiment of the present disclosure and comprises a game processing unit 61, an event generation unit 62, a detailed information output unit 63, an image output unit 64, a UI object placement unit 65, a time counting unit 66, and a UI object removal unit 67. The information processing program may be stored in a non-transitory computer-readable medium and installed in the processor 60 from there.

The game processing unit 61 executes game processing based on the application program, game data provided by the game data providing unit 11 of the server device 100, and input signals from the input device 80. The event generation unit 62 generates events in response to the user's instructions to the input device 80 to generate events. The detailed information output unit 63 outputs the detailed information of the related guide upon receiving an input signal that indicates that the guide UI object 642 is indicated from the input device 80. The image output unit 64 generates a displayed image to be displayed on the display device 70 and outputs it to the display device 70.

The UI object placement unit 65 selects a guide from among a plurality of guides to which a UI object is to be placed, and displays the selected guide UI objects are placed so that they are included in the displayed image. The time counting unit 66 starts time counting when the detailed information about the guide information for which the guide UI object is placed in the displayed image has been viewed by the user and checks whether or not the predetermined valid period set for the guide has elapsed. The UI object removal unit 67 sets the status of the guide information (see FIG. 7) to "valid period elapsed" when the time counting unit 66 determines that the valid period has elapsed for the guide information in which the guide UI object is placed, and when other removal conditions are met.

(Selection of Guide Information)

As described above, a maximum of two guide UI objects are displayed on the displayed image of the game device 200. When there are three or more candidates for guide information to be presented to the user, two guide information to be presented to the user are selected from among them.

Figure 4:
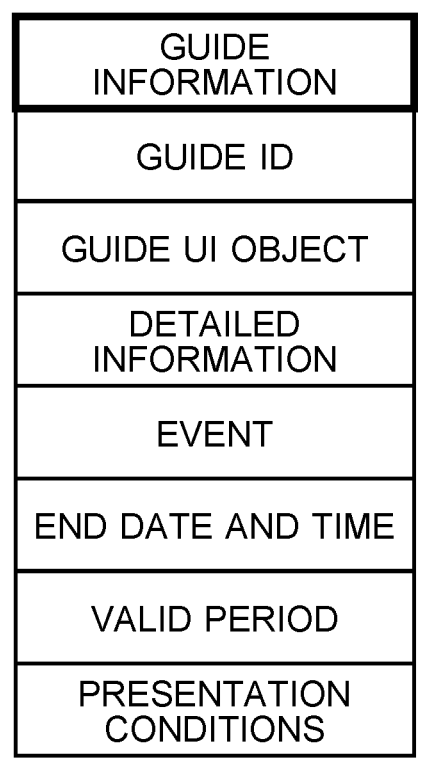
FIG. 4 shows contents of guide information stored in the storage device in an embodiment of the present disclosure.

FIG. 4 shows the contents of guide information stored in the storage device in an embodiment of the present disclosure. In this example, the storage device 20 stores at least one of the following: for each guide information; a guide ID that identifies the guide information; a guide UI object to be placed in the displayed image; detailed information indicating the detailed contents of the guide information; an event to be guided by the guide information; end date and time at which the presentation of the guide information is to be terminated; the valid period, which is the time at which the guide UI object is placed in the displayed image of each game device 200; and presentation conditions used for selecting the guide information.

The guide UI object 642 is an image such as an icon, button, tile, etc., and as shown in FIG. 2, it represents the contents of the guide information by characters and patterns. In addition, as described below, the guide UI object 642 displays the remaining time after viewing. Detailed information is displayed when the user performs an indication operation on the guide UI object 642 (specifically, tapping the guide UI object 642). The detailed information is displayed on the display device 70 by the user performing an indication operation on the guide UI object 642 (specifically, tapping the guide UI object 642). The detailed information may be information consisting of images and text and may also include audio and video.

The detailed information is, for example, a guide to an event, a guide to various services, or a guide to a gift. There are two types of events: a first event which is available for the user who indicated the guide UI object in a game, from the detailed information has been viewed by the indication until the valid period lapsed; and a second event in which the user can participate until a specified end date and time regardless of whether the detailed information has been viewed. The first event is, for example, a discount sale campaign in which the price of items that can be purchased by the user in the game is lower than a normal price when the first event has not occurred. The second event is, for example, a campaign in which users can experience a particular service for free. The contents of the event are stored in the storage device 20.

The valid period is the time period from the time when the user has viewed the detailed information to the time when the presentation of the guide information to the user is terminated and is set for each guide information as, for example, 10 minutes, 1 hour, 24 hours, etc. The end date and time is the date and time when the presentation of the guide information ends for any user, regardless of whether or not the user has already viewed the detailed information.

The presentation condition is the condition for presenting the guide information preferentially. These presentation conditions may include conditions related to the past behavioral history of the user in the game, such as the history of item purchases, the history of use of various services, and the time when the user started the game. Suppose the guide information is, for example, a discount sale campaign for a specific item. In that case, the presentation conditions may include, for example, the following conditions: the user ID satisfies the specified conditions (so that only a certain percentage of users can be targeted); the user has not purchased the item; and the user is not currently in possession of the item. Suppose the guide information is a discount sale campaign for a package of items for beginners, for example. In that case, the presentation condition is that the user has started playing the game within a certain period of time (e.g., 48 hours) and has not yet purchased the package. In addition, the presentation condition may be one that prioritizes the one with the highest priority set for each guide information. For example, in this example, the priority level is one of low, medium, high, or highest, but many more levels may be set in more detail.

When there is three or more guide information, the guide information providing unit 12 selects the guide information that satisfies the presentation conditions and provides it to the game device 200. Here, the guide information providing unit 12 may narrow down the guide information by imposing only some presentation conditions. Also, the information may be provided to the game device 200 without determining the presentation conditions. For example, in the above example of a discount sale campaign for a specific item, only the condition that the item has not yet been purchased among the presentation conditions may be determined by the guide information providing unit 12 of the server device 100, and if the condition is satisfied, the information is provided to the game device 200.

The UI object placement unit 65 of the game device 200 selects two UI objects to be displayed in the displayed image from among the plurality of guide information provided by the server device 100, and places them in the displayed image. Specifically, the UI object placement unit 65 of the game device 200 narrows down the guide information by determining the presentation conditions that were not determined by the server device 100, and further selects the guide information to be presented according to the priority level. Here, the UI object placement unit 65 sets the priority level to the highest for guide information or select the guide information to be placed in the displayed image regardless of the priority level, for which the detailed information has been viewed and the counting down of the valid period has started.

(Presentation of Detailed Information)

Figure 5:
FIG. 5 shows an example of the presentation of detailed information in an embodiment of the present disclosure.

FIG. 5 shows an example of the presentation of detailed information in an embodiment of the present disclosure. When the user indicates the guide UI object 642 shown in the displayed image 641 in FIG. 2 (e.g., tapping the guide UI object 642), the detailed information output unit 63 displays a detailed information window 643 superimposed on the game image, as shown in FIG. 5. In the case where the display device 70 and the input device 80 are provided as separate units, the user may indicate the guide object 642 by, for example, operating the mouse as the input device 80 to operate the cursor displayed on the display device 70 and point to the button as the guide UI object 642. If the input device 80 is a keyboard, the user may indicate the guide object 642 by key input.

As shown in FIG. 2, if the guide UI object 642 is displayed on the displayed image 641, and it is within the valid period, then the detailed information window 643 will be launched in response to the instruction to the guide UI object 642. The example in FIG. 5 shows the details of the guide information for a promotional campaign in which a discount sale of a beginner's package of items is offered to users who have just started playing the game.

The detailed information includes a button 644 for indicating to purchase the guided item (the beginner's package) and a button 645 for indicating not to purchase the item. When the button 644 is indicated, the scene transitions to the item purchase scene, where further detailed information for purchasing the item is presented. If a user operation pertaining to the purchase of an item is performed in the purchasing scene, the process for purchasing the item begins. On the other hand, when the button 645 is indicated, the detailed information window 643 closes and returns to the normal displayed image, including the game image.

Figure 6:
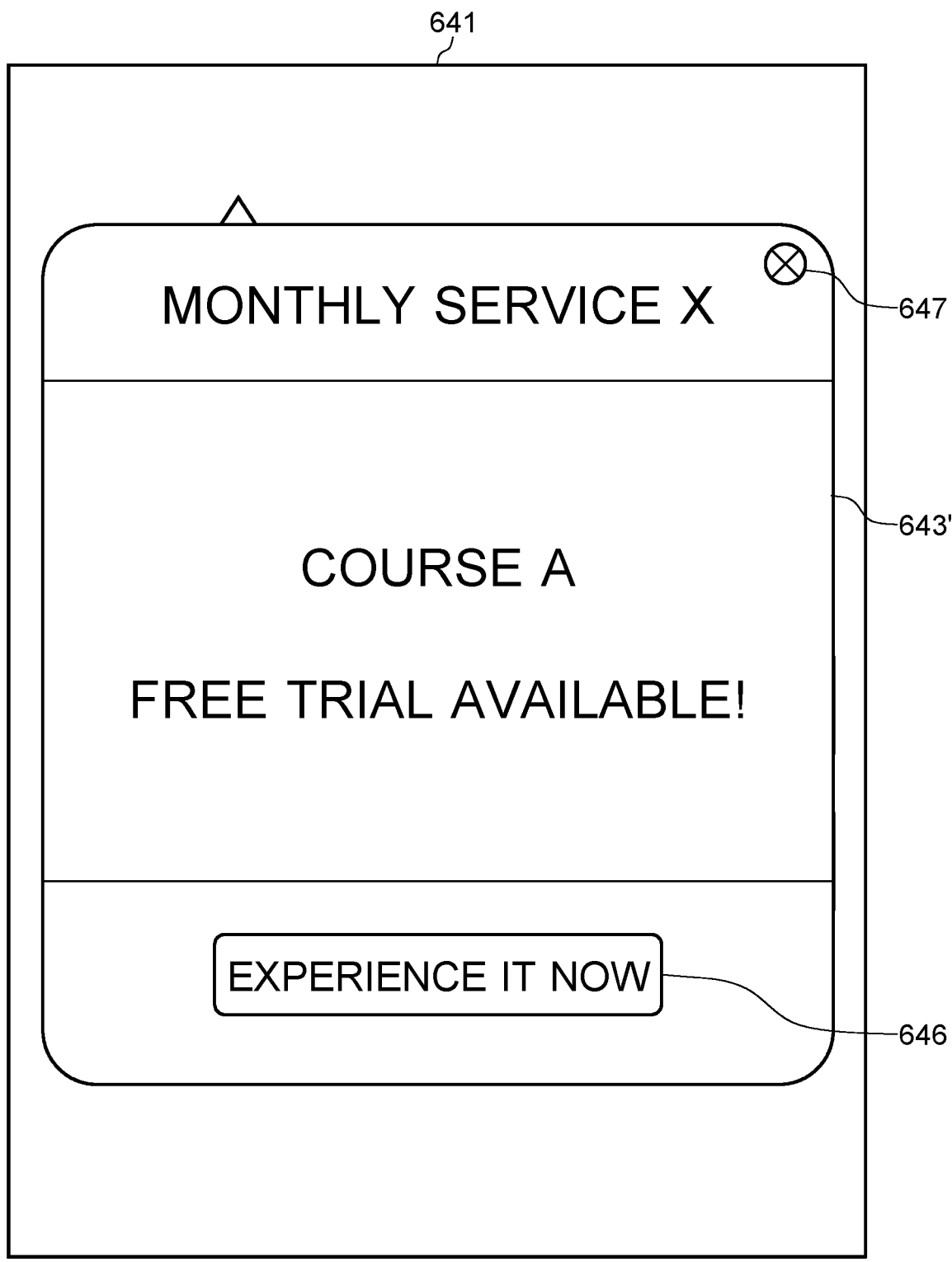
FIG. 6 shows an example of the presentation of detailed information in an embodiment of the present disclosure.

FIG. 6 shows an example of the presentation of detailed information in an embodiment of the present disclosure. In this example, the detailed information is an invitation to experience a monthly subscription service, specifically, an invitation to experience Course A of a monthly subscription service among multiple courses. In the detailed information window 643', there is a button 646 to apply for the trial and a button 646 to close the detailed information window 643'.

(Valid Period of Guide Information Presentation)

As described above, guide information has a valid period, and the guide information indicated by the guide UI object 642 is presented to each user in a timed manner. After the guide UI object 642 is placed on the game screen, when the detailed information of the guide UI object 642 becomes readable, the time counting unit 66 starts time counting, and the countdown of the valid period starts. Note that the detailed information can be presented as many times as necessary even after being viewed by indicating the guide UI object 642 within the valid period.

In addition, when the guide information is a guide to an event, the event generation unit 62 may generate an event that includes that user as a target, i.e., an event in which that user can participate or can use, in response that the guide UI object indicated for the first time. For example, if the event is a discount sale campaign for a predetermined item, the event generation unit 62 generates this timed discount sale campaign and starts the discount sale for this user.

In this way, by setting not only an end date and time but also a valid period for the guide information, the guide information can be presented fairly to multiple users. For example, suppose the guide information is an item discount sale campaign, and only the end date and time are set. In that case, there will be a difference in the period during which the campaign can be used between a user who is presented with the campaign information well in advance of the end date and time (e.g., one week before) and a user who is presented with the campaign information when the end date and time is close (e.g., three days before). In contrast, in this embodiment, the countdown of the valid period (e.g., 48 hours) starts after the detailed information has been viewed by each user so that all users are given the same available time.

On the other hand, it is possible that the guide information may not be of interest to the user. Therefore, it is also not appropriate that the guide UI object 642 of such guide information can be used for a long time after the user first views the detailed information of such guide information. Conversely, a user who is interested in the guide information may want to check the detailed information again after first viewing the detailed information of such guide information. Therefore, in this embodiment, as described above, in order to allow the user to check the detailed information as many times as possible during the valid period without immediately erasing the guide UI object 642 after making it readable, the system starts a countdown of the valid period (e.g., 10 minutes) after the detailed information becomes readable and does not erase the guide UI object 642 until the valid period has lapsed.

Figure 7:
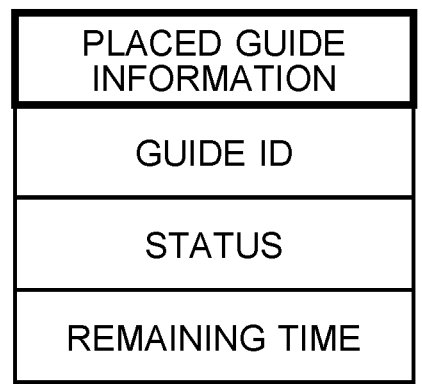
FIG. 7 shows a structure of placed guide information stored in the storage device of the game device in an embodiment of the present disclosure.

FIG. 7 shows a structure of placed guide information stored in the storage device of the game device in an embodiment of the present disclosure. The storage device 40 of the game device 200 stores information about the guide information of which the guide UI object 642 to be placed in a game image of the game device 200. Placed guide information includes a guide ID, a status, and information on the remaining time. There are three statuses as the status: "unviewed," indicating that the guide UI object 642 has not yet been indicated and the detailed information has never been presented, "viewed already," indicating that the detailed information has already been presented, and "valid period elapsed," indicating that the valid period has already elapsed. The remaining time is the time obtained by subtracting the time measured by the time counting unit 66 from the valid period of the guide information in question and decreases as the time counting unit 66 measures the time. When the valid period has elapsed, the remaining time becomes zero.

Figure 8:
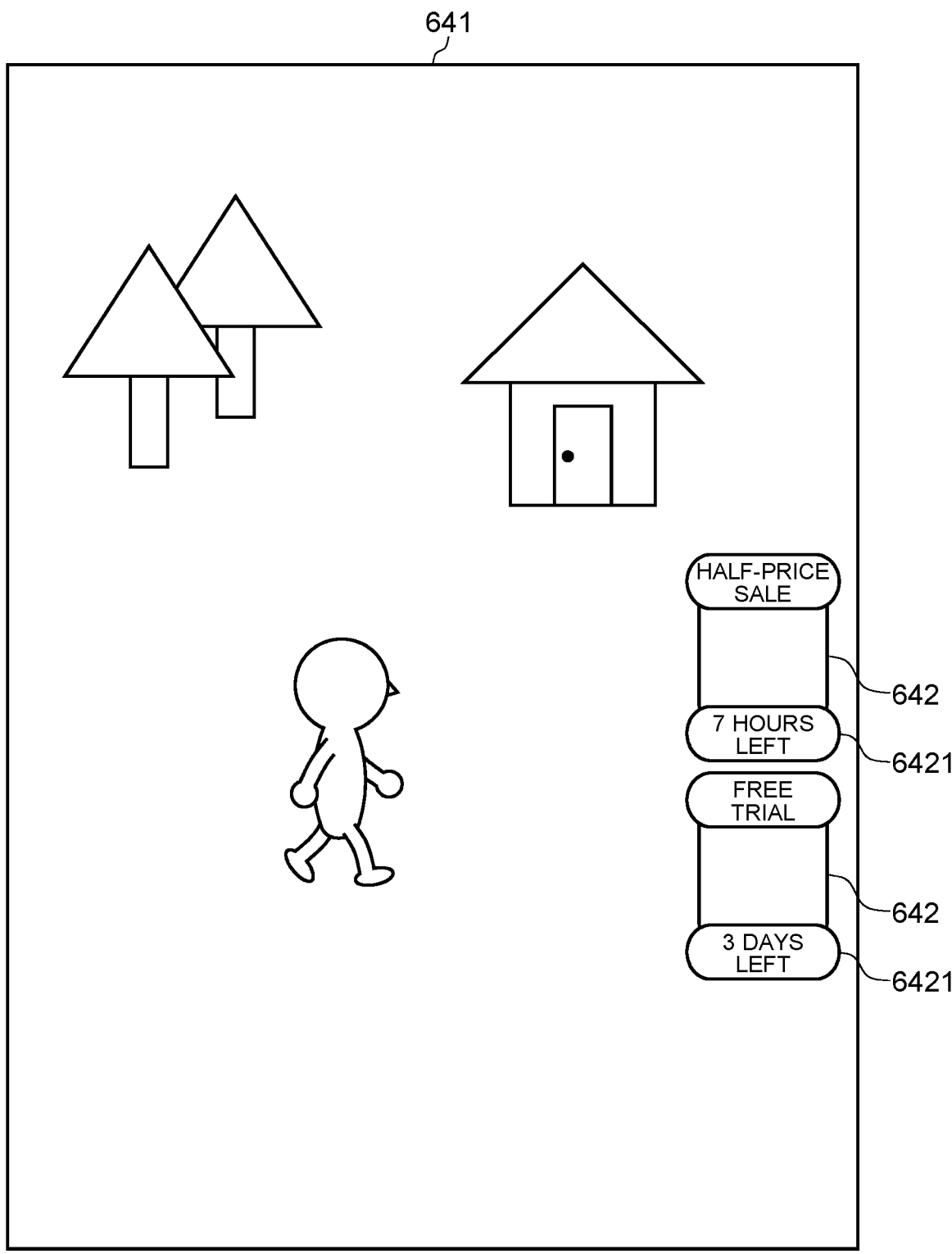
FIG. 8 shows an example of a displayed image in a game in an embodiment of the present disclosure.

FIG. 8 shows an example of a displayed image in a game in an embodiment of the present disclosure. In particular, FIG. 8 shows the state after the guide information has been viewed. FIG. 2 is an example of the unviewed state of the guide information. Comparing FIG. 2 with FIG. 8, it can be seen that the display of the guide UI objects in the displayed image changes in accordance with the fact that the detailed information has been changed from the unviewed state to the viewed state, the display format of the guide UI object included in the displayed image changes from a display format that does not include the notation related to the time counting of the time counting unit 66 (FIG. 2) to a display format that includes the notation (FIG. 8). Specifically, after the guide information has been viewed, the guide UI object 642 has an indication of the remaining time for the presentation of the guide information.

When the guide UI object 642 is indicated for the first time and its detailed information is presented for the first time, the time counting unit 66 changes the status in the placed guide information (see FIG. 7) of the guide information as "viewed already" and starts time counting. In this way, the time counting unit 66 starts time counting when the detailed information of the guide information is viewed, more precisely, when the first indication operation is performed on the guide UI object, the time counting unit 66 considers that the detailed information has been viewed and start the time counting. The time counting unit 66 may alternatively consider that the detailed information has been viewed and start time counting when the detailed information output unit 63 outputs the detailed information to the display device 70 for the first time. Alternatively, the time counting unit 66 may consider the detailed information to have been viewed when all of the detailed information is considered to have been displayed on the display unit 70 for the first time, such as, for example, when all of the detailed information has been displayed on the display device by the user's scrolling operation of the screen, or when the video presented as detailed information has been played to the end, etc., and start time counting. Furthermore, the time counting unit 66 may consider that the detailed information has been viewed and start time counting when the first display of the detailed information has been completed.

The UI object placement unit 65 may, after the detailed information of the guide information has been viewed, add a remaining time indication 6421 for the presentation of the guide information onto the guide UI object 642. The UI object placement unit 65 updates the remaining time indication 6421 of the presentation of the guide information in a predetermined cycle by referring to the remaining time of the placed guide information (see FIG. 7). Specifically, if the remaining time is more than one day, the UI object placement unit 65 displays the remaining time in days as the remaining time indication 6421 and updates the remaining time indication 6421 in one-day cycles, if the remaining time is less than one day and more than one hour, the UI object placement unit 65 displays the remaining time in hours as the remaining time indication 6421 and updates the remaining time indication 6421 in one-hour cycles, if the remaining time is less than one hours and more than one minute, the UI object placement unit 65 displays the remaining time in minutes as the remaining time indication 6421 and updates the remaining time indication 6421 in one-minute cycles, if the remaining time is less than one minute, the UI object placement unit 65 displays the remaining time in seconds as the remaining time indication 6421 and updates the remaining time indication 6421 in one-second cycles.

The UI object removal unit 67 removes the UI object 642 from the displayed image for the guide information for which the valid period has been determined to have elapsed by the time counting unit 66. Specifically, the UI object removal unit 67 updates the status in the placed guide information (see FIG. 7) of the guide information for which the valid period has elapsed to "valid period elapsed." However, in this embodiment, the UI object removal unit 67 does not immediately remove the guide UI object 642 of the guide information for which the predetermined time has passed and the remaining time has become 0 from the displayed image, and the UI object placement unit 645 sets the remaining time indication 6421 to 0 or shows the expiration of the valid period, etc.

When the displayed image is updated due to the transitioning to a new scene due to the game progress by the game processing section 61 etc., the UI object removal section 67 refers to the placed guide information in the storage device 40 and removes the guide UI object 642 of the guide information whose status is "valid period lapsed" from the displayed image 641. Accordingly, the UI object placement section 65 does not include the guide UI object 642 of the guide information in question in the updated display screen and places only the guide UI object 642 that should be displayed. Such a transition of the scene for updating the displayed image occurs, for example, when moving to another game stage, opening a setting screen, or returning to the home screen from a game stage. In this way, in this embodiment, since the guide UI object 642 is not immediately removed from the displayed image when the valid period lapsed, it is possible that the guide UI object 642, whose placement has already been released after the valid period has lapsed, is included in the displayed image 641 and that the guide UI object 642 is indicated.

Figure 9:
FIG. 9 shows a displayed image when the guide UI object of the guide information whose valid period has lapsed is indicated, in an embodiment of the present disclosure.

FIG. 9 shows a displayed image when the guide UI object of the guide information whose valid period has lapsed is indicated, in an embodiment of the present disclosure. When the guide UI object 642 of the guide information whose valid period has lapsed is indicated, the detailed information output unit 63 outputs the termination notification window 648 shown in FIG. 9 instead of the detailed information window to display the termination of the guide. In this termination notification window 648, there is an indication that the guide has ended, and a button 649 is provided. When the button 649 is indicated, termination notification window 648 closes, and the screen returns to the game screen. Note that the UI object placement unit 65 may remove the guide UI object 642 of the guide information whose valid period has lapsed from the displayed image at this timing.

Figure 10:
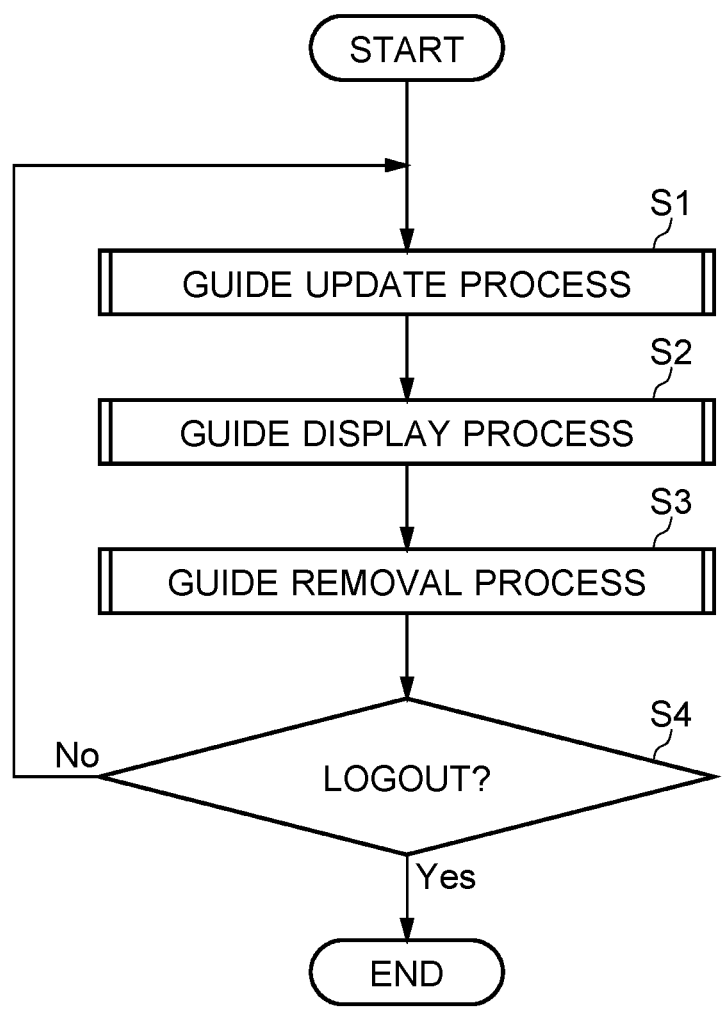
FIG. 10 shows a flowchart of an information processing method executed in a game device in an embodiment of the present disclosure.

FIG. 10 shows a flowchart of an information processing method executed in a game device in an embodiment of the present disclosure. This flowchart starts when a user logs in to a game in the game device 200, that is, when a game is started from a state where no game is being played. First, a guide update process is performed to update the guide UI object 642 to be placed, i.e., the guide information to be presented to the user (Step S1). Next, the game device 200 performs the guide display process for presenting the guide information (Step S2). Then, the game device 200 conducts the guide removal process to remove the guide UI object 642 of the guide information whose valid period has passed since it was viewed is removed from the displayed image (Step S3).

Figure 11:
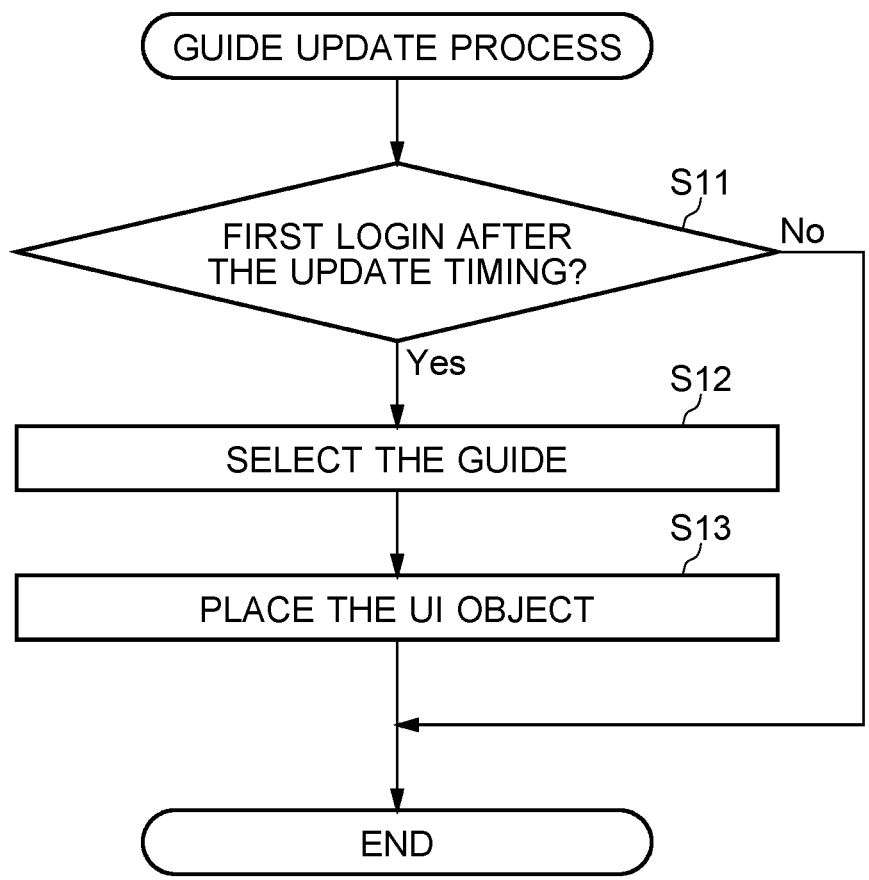
FIG. 11 shows a flowchart of a guide update process in an embodiment of the present disclosure.

FIG. 11 shows a flowchart of a guide update process in an embodiment of the present disclosure. In the guide update process (Step S1 in FIG. 10), the UI object placement unit 65 determines whether or not it is the first login after the update timing (Step S11). If it is not the first login after the update timing (No in Step S11), it moves to the guide process (Step S2 in FIG. 1). If it is the first login after the update timing (Yes in Step S11), the UI object placement unit 65 inquires the guide information to be presented to the server device 100. If the update timing occurs during the login, it is also determined to be the first login after the update timing (Yes in Step S11). In this system, the update timing is set to a predetermined time every day, i.e., at most once a day. The update timing is not limited to this, for example, it may be every 12 hours (updated twice a day) or every two days (updated once every two days).

The UI object placement unit 65 queries the server device 100 for the guide information to be presented when the login is the first login after the update timing. When the UI object placement unit 65 receives the guide information to be presented from the server device 100, it selects the guide information to be presented in the game device 200 (Step S12) and places the guide UI object 642 (Step S13). The selection of the guide UI object 642 here is as described above. In this way, the UI object placement unit 65 periodically updates the guide UI objects to be placed.

In this way, The UI object placement section 65 does not immediately place a new guide UI object even if the placement of the guide information is released and the guide UI object is removed, the UI object placement unit 65 does not immediately place a new guide UI object, but sets an update cycle (for example, one day) and updates the guide UI object to be placed when it is the first login after the update timing is exceeded. This eliminates the need for the game device 200 to access the server device 100 frequently and reduces the communication burden.

Figure 12:
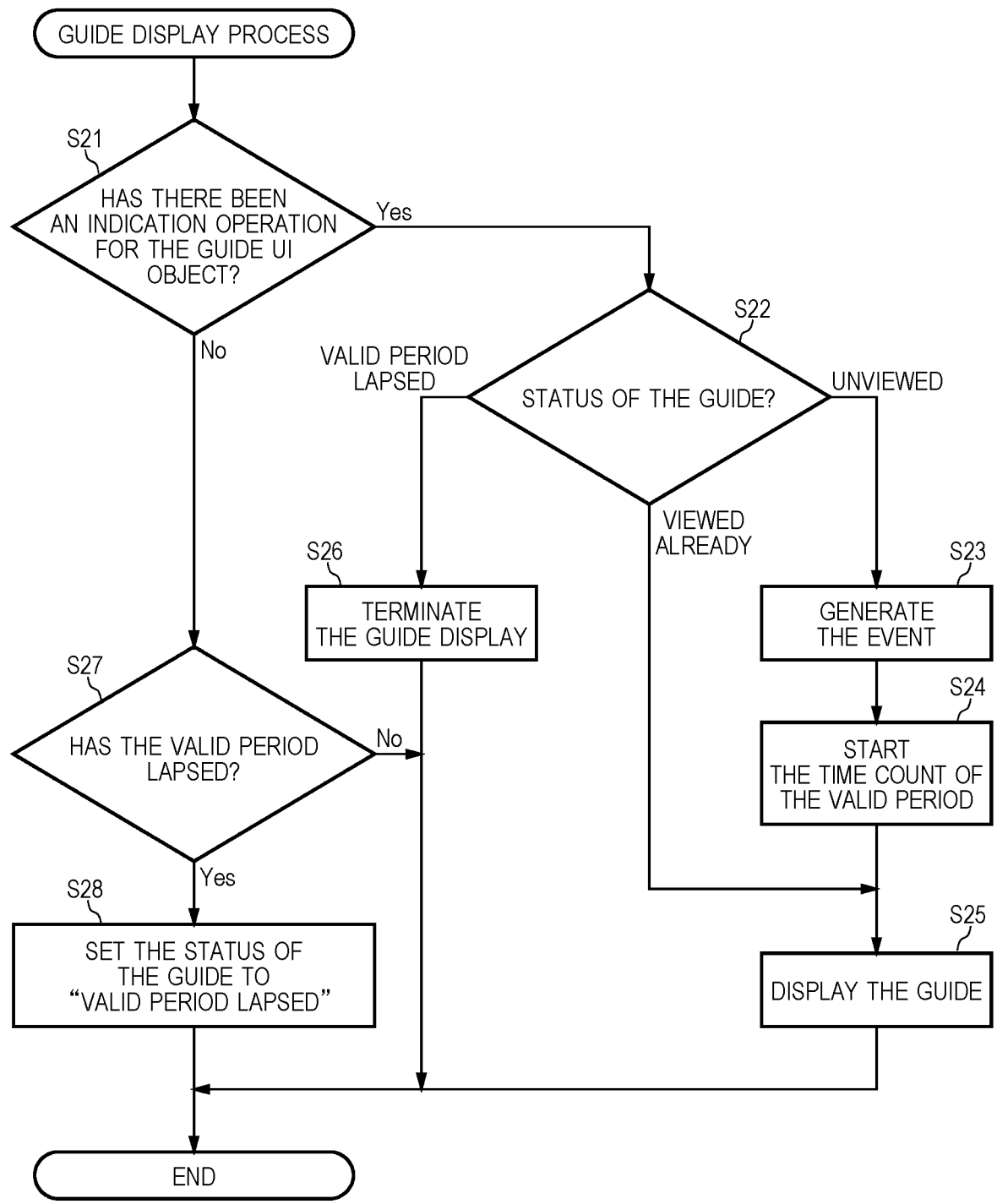
FIG. 12 shows a flowchart of a guide process in an embodiment of the present disclosure.

FIG. 12 shows a flowchart of a guide process in an embodiment of the present disclosure. In the guide process (Step S2 in FIG. 10), the detailed information output unit 63 determines whether or not there has been an indication operation for the guide UI object 642 (Step S21). If there is no indication operation (No in Step S21), the time counting unit 66 determines whether or not the counted time of the guide information whose detailed information has already been viewed has passed the valid period of the guide information (step S27). If the valid period has not elapsed (No in Step S27), the process shifts to the guide removal process (Step S3 in FIG. 10).

If the valid period has elapsed (Yes in step S27), the UI object placement removal unit 67 sets the status of the placed guide information in the storage device 40 of the relevant guide information to "valid period lapsed" (Step S28).

When there is an indication operation for guide UI object 642 (Yes in Step S21), the detailed information output unit 63 refers to the placed guide information in the storage device 40 (see FIG. 7) and confirms the status of the guide information (Step S22). If the status of the guide information is "unviewed" ("unviewed" in Step S22), the event generation unit 62 generates the event (Step S23), the time counting unit 66 starts to count the valid period (Step S24), and the detailed information output unit 63 outputs the detailed information (Step S25). If the status of the guide information is "viewed already" ("viewed already" in Step S22), the event has already occurred and the time counting has already started, so the detailed information output unit 63 outputs detailed information (Step S25).

Even when there is an indication operation on the UI object (Yes in Step S21), if the status of the guide information is "valid period lapsed", then the termination notification window 648 is output, and the termination of the guide is displayed (Step S26).

Figure 13:
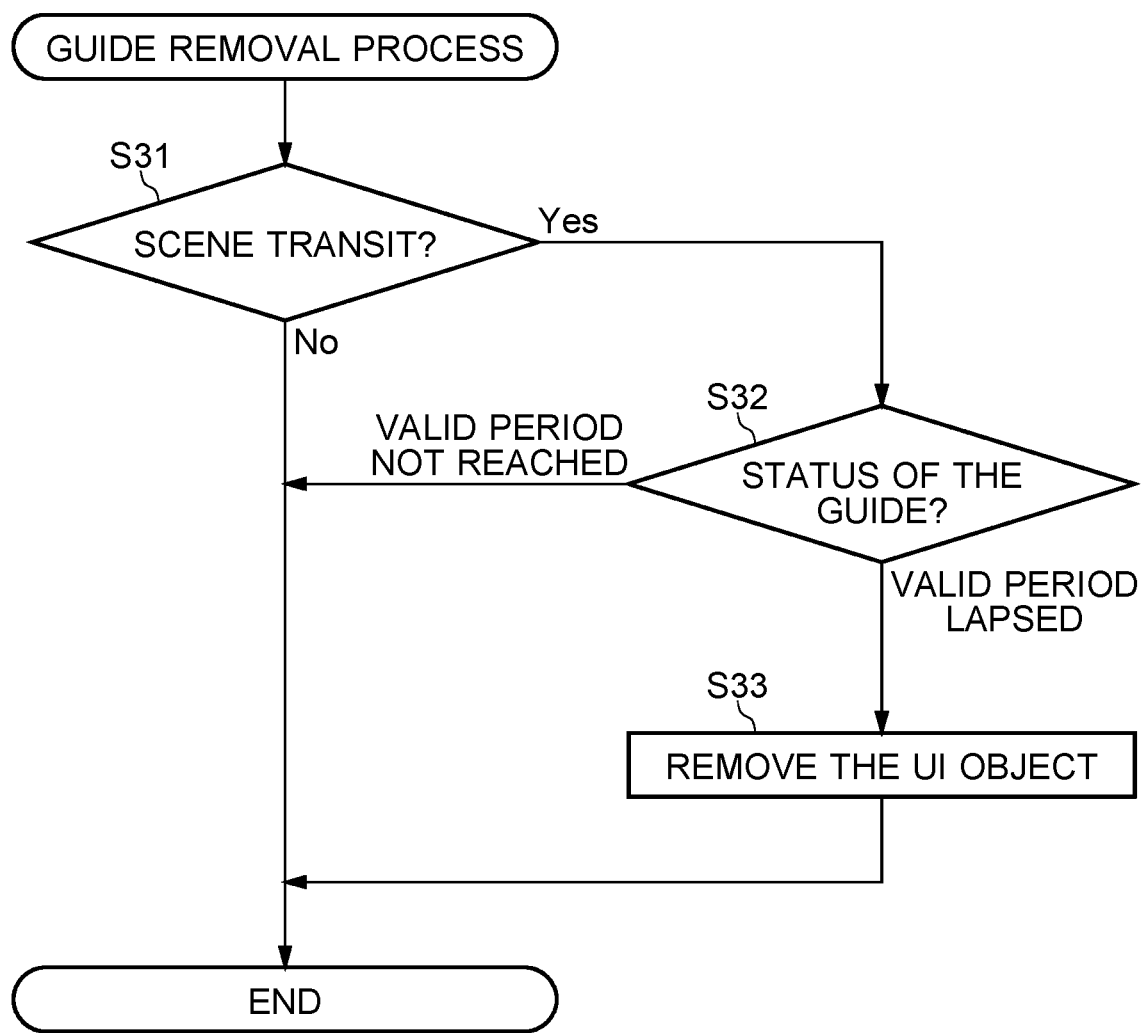
FIG. 13 shows a flowchart of an image update process in an embodiment of the present disclosure.

FIG. 13 shows a flowchart of an image update process in an embodiment of the present disclosure. The game processing unit 61 determines whether or not the scene transitions according to the development of the game (Step S31). For example, in a game, game data of a virtual space is provided from the server device 100 to the game device 200, and the game device 200 expands this game data in its memory and processes the game. When moving to a virtual space other than the one provided by the server device 100, the game device 200 obtains new game data from the server device 100 or expands new game data in its memory. For example, in this case, the scene transitions in the game device 200.

If there is any guide information whose status is "valid period lapsed" ("valid period lapsed" in Step S32), the UI object placement unit 65 deletes the guide UI object 642 from the displayed image and ends the process. If there is no guide information whose status is "valid period elapsed" ("valid period not reached" in Step S32), the process moves directly to the logout confirmation (Step S4 in FIG. 10).

Although the illustration is omitted, there are other cases in which a guide UI object is removed when a scene transitions. First, for the second event that occurs regardless of whether or not the guide UI object 642 has been viewed, if the end date and time have already arrived, the UI object removal section 67 sets the status as "valid period elapsed" even before the valid period has elapsed since the detailed information was viewed, without waiting for the valid period to elapse. The UI object placement section 65 shall, at the time of scene transition, remove the guide UI object 642 from the guide UI object 642 to be placed, and the UI object placement section 65 excludes the guide UI object 642 from the guide UI object 642 that should be placed during scene transitions.

When the purpose of the guide information has been achieved by the user performing a predetermined action in accordance with the guide information, for example, when the guide information is a sales promotion campaign for a predetermined item and the user purchases the item, the UI object removal unit 67 assumes that the purpose of the guide information has been achieved and sets the status to "valid period elapsed" without waiting for the elapse of the valid period, and the UI object placement unit 65 excludes the guide UI object 642 from the guide UI object 642 that should be placed during scene transitions. Alternatively, UI object removal unit 67 sets the status to "valid period elapsed" on the condition that the detailed information has been viewed a predetermined number of times and excludes the guide UI object 642 from the guide UI object 642 that should be placed during the scene transitions.

As described above, according to the information processing system of an embodiment of the present disclosure, since the period for placing a guide UI object for displaying detailed information of the guide information is set to be from the time when the detailed information has been viewed to the time when the valid period has elapsed, the guide information can be placed in an appropriate period for each user.

The information presented to the user by indicating the UI object is not limited to the guide information but may also be other information that is presented in a timed manner. In addition, in the above embodiment, we have described an example in which the present disclosure is applied to a game application, but the application is not limited to game applications and can be applied to any other application.

In the above embodiment, the information processing system 1000 consists of a server device 100 and game devices 200 as information processing devices, but instead, the functions of the storage device 20 and the guide information providing unit 12 may be provided in the game device 200, and the above functions may be realized by the information processing device alone.

In addition, in the above embodiment, the UI object placement unit 65 places guide UI objects in a form superimposed on the virtual space image. Alternatively, the UI object placement unit 65 may place the guide UI object in the virtual space. In this case, the image output unit 64 can output the virtual space image obtained by capturing the virtual space in which such guide UI objects are placed with a virtual camera so that the guide UI object is displayed on the display screen of the display device.

In the above embodiment, the guide UI object 642 is not immediately removed from the displayed image even if a valid period has passed since the guide UI object 642 was first indicated, and the detailed information has been viewed, and the status of the guide information is set to "valid period elapsed," then the guide UI object 642 is removed during the scene transition. Instead, the guide UI object 642 may be removed from the displayed image as soon as the valid period has elapsed, or the guide UI object 642 of the guide information for which the valid period has elapsed may be removed from the displayed image in response to other triggers.

What is claimed is:

1. An information processing system comprising a processor, wherein the processor is configured to:
   output a displayed image to a display device during execution of a predetermined application;
   place a UI object so that the UI object is included in the displayed image;
   output to the display device the detailed information associated with the UI object when a user indicates the UI object included in the displayed image; and
   when a predetermined time has elapsed since the detailed information has been viewed, remove the UI object from the displayed image so that it is not included in the displayed image,
   wherein the processor is further configured to, in the predetermined application, from the time the UI object has been viewed until the predetermined time passes, generate a first event in which the user is included as a target, and when placing the UI object, in response to unviewed detailed information having been viewed, place the UI object in a second display format including notification about the predetermined time instead of the UI object in a first format not including the notification.

2. The information processing system according to claim 1, wherein the processor is configured to, in the removal of the UI object, determine that the detailed information has been viewed either: when a first indication operation among indication operations on the UI object is performed; when the detailed information is output to the display device for the first time; when all of the detailed information is displayed on the display device for the first time; or when a display of the detailed information for the first time has been completed.

3. The information processing system according to claim 1, wherein the displayed image is a virtual space image obtained by capturing a virtual space with a virtual camera, and the processor is configured to, when placing the UI object, superimpose the UI object on the virtual space image.

4. The information processing system according to claim 1, wherein the displayed image is a virtual space image obtained by capturing a virtual space with a virtual camera, and the processor is configured to, when placing the UI object, place the UI object in the virtual space.

5. The information processing system according to claim 1, wherein the first event is an event in which a price of an item available for purchase by the user in the predetermined application is lower than when the first event has not occurred, and the processor is configured to, when outputting the detailed information, output a second detailed information for the purchase of an item to the display device in response to a user's indication operation on the detailed information.

6. The information processing system according to claim 1, wherein the processor is further configured to generate a second event to be implemented within the predetermined application until a predetermined endpoint, and the processer is configured to, when removing the UI object, if the predetermined endpoint arrives before the predetermined time has elapsed since the detailed information about the second event has been viewed, remove the UI object from the displayed image without waiting for the elapse of the predetermined time.

7. The information processing system according to claim 6, wherein the processor is further configured to, when removing the UI object, remove the UI object from the displayed image when the user performs a predetermined action in the first event or the second event.

8. The information processing system according to claim 1, wherein the processor is configured to, when placing the UI object, select and place at least one of the UI objects from a plurality of candidates.

9. The information processing system according to claim 8, wherein the processor is configured to, when placing the UI object, select the UI object to be placed from the plurality of candidates based on a history of past user behavior in the predetermined application.

10. The information processing system according to claim 8, wherein each of the plurality of candidates is configured to have a priority level, and the processor is configured to, when placing the UI object, select the UI object to be placed according to the priority level.

11. The information processing system according to claim 1, wherein the processor is configured to, when placing the UI object, periodically select the UI object to be placed.

12. The information processing system according to claim 11, wherein the processor is configured to, when selecting the UI object to be placed, select the UI object for which the predetermined time has not elapsed since the detailed information has been viewed giving priority to other UI objects.

13. The information processing system according to claim 1, wherein the processor is configured to, when removing the UI object, remove the UI object from the displayed image when a scene transition is performed in the predetermined application after the predetermined time lapsed.

14. The information processing system according to claim 1, wherein the processor is configured to, when outputting the detailed information, output the detailed information whenever the user indicates the UI object included in the displayed image, even after the detailed information has been viewed.

15. An information processing system comprising:
an image output unit configured to output a displayed image to a display device during execution of a predetermined application; and
a processor, wherein
the processor is configured to:
output a displayed image to a display device during execution of a predetermined application;
place a UI object so that the UI object is included in the displayed image;
output to the display device the detailed information associated with the UI object when a user indicates the UI object included in the displayed image; and
when a predetermined time has elapsed since the detailed information has been viewed, remove the UI object from the displayed image so that it is not included in the displayed image,
wherein the processor is further configured to, in the predetermined application, from the time the UI object has been viewed until the predetermined time passes, generate a first event in which the user is included as a target, and
when placing the UI object, in response to unviewed detailed information having been viewed, place the UI object in a second display format including notification about the predetermined time instead of the UI object in a first format not including the notification.

16. An information processing method comprising:
outputting a displayed image to a display device during execution of a predetermined application;
placing a UI object so that the UI object is included in the displayed image;
outputting to the display device the detailed information associated with the UI object when a user indicates the UI object included in the displayed image;
when a predetermined time has elapsed since the detailed information has been viewed, removing the UI object from the displayed image so that it is not included in the displayed image;
generating a first event in which the user is included as a target in the predetermined application, from the time the UI object has been viewed until the predetermined time passes, and
when placing the UI object, placing the UI object in a second display format including notification about the predetermined time instead of the UI object in a first format not including the notification in response to unviewed detailed information having been viewed.

17. A non-transitory computer-readable medium storing an information processing program, wherein the information processing program causes a computer of an information processing apparatus to:
output a displayed image to a display device during execution of a predetermined application;
place a UI object so that the UI object is included in the displayed image;
output to the display device the detailed information associated with the UI object when a user indicates the UI object included in the displayed image;
when a predetermined time has elapsed since the detailed information has been viewed, remove the UI object from the displayed image so that it is not included in the displayed image;
generate a first event in which the user is included as a target in the predetermined application, from the time the UI object has been viewed until the predetermined time passes, and
when placing the UI object, place the UI object in a second display format including notification about the predetermined time instead of the UI object in a first format not including the notification in response to unviewed detailed information having been viewed.

* * * * *